J. F. KINGSLEY.
DIE FOR MAKING EYE BARS.
No. 11,001. Reissued Apr. 30, 1889.
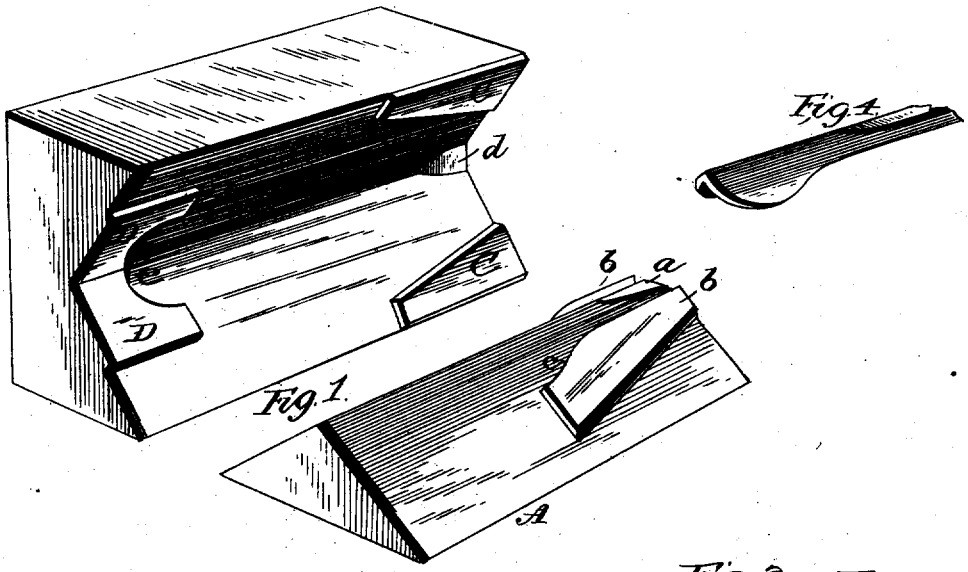
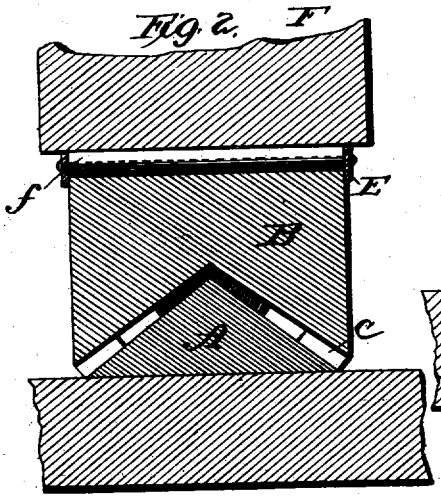
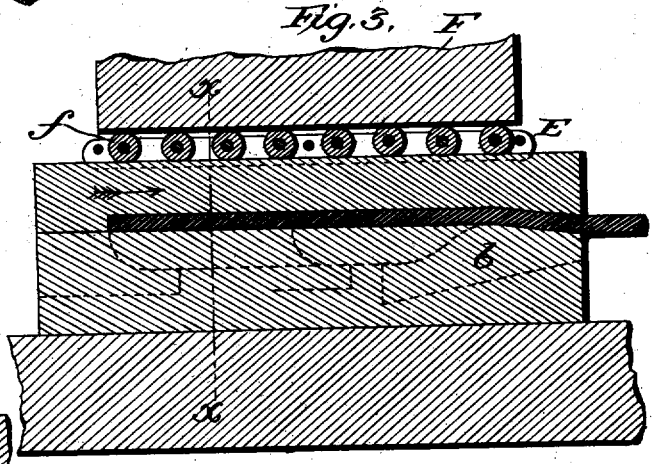
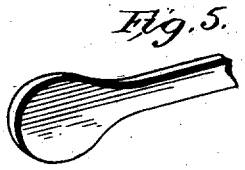
Attest
Walter Donaldson
James M. Spear.
Inventor
John F. Kingsley
by Ellis Spear
Atty.
N. PETERS, Photo-Lithographer, Washington, D. C.

UNITED STATES PATENT OFFICE.

JOHN F. KINGSLEY, OF ATHENS, PENNSYLVANIA.

DIE FOR MAKING EYE-BARS.

SPECIFICATION forming part of Reissued Letters Patent No. 11,001, dated April 30, 1889.

Original No. 357,833, dated February 15, 1887. Application for reissue filed February 11, 1889. Serial No. 299,526.

*To all whom it may concern:*

Be it known that I, JOHN F. KINGSLEY, a citizen of the United States, residing at Athens, in the county of Bradford and State of Pennsylvania, have invented certain new and useful Improvements in Dies for Making Eye-Bars; and I do hereby declare that the following is a full, clear, and exact description of the same.

The present invention has relation to the means for making eye-bars; and it consists in a die of peculiar construction, and also a frame provided with rollers upon which bears the former-head or other agency used for bringing the desired pressure upon the upper die-section, as will be hereinafter described and claimed.

In the accompanying drawings, forming a part of this specification, Figure 1 is a perspective view of the two sections forming the die used in the practice of my invention. Fig. 2 is a transverse section through said die-sections, the latter being represented in operative position with respect to the eye-bar. Fig. 3 is a longitudinal section through the die and the eye-bar, the relative positions represented in Fig. 2 being still preserved. Fig. 4 is a perspective view of so much of an eye-bar as is operated upon by the improved die; and Fig. 5 is also a perspective view of a like portion of an eye-bar, the same being represented as finished and ready to be perforated.

In carrying out my invention I employ a lower die-section, A, which is triangular in cross-section and cut away at its apex at one end thereof, as represented at *a* in the lower portion of Fig. 1. The said section A is rigidly supported upon any suitable base, and is provided on each side of its inclined faces, near one end of the same, with a projection, *b*, which is of the form most distinctly seen in Fig. 1, and also represented in Fig. 3 by dotted lines.

It will be observed by reference to Fig. 1 that the upper portion of the projection *b* is cut away, as represented at *c*, so that the space between the adjacent edges of the two projections of the die-section A is formed substantially parallel a portion of its distance and then gradually widens or flares in a direction toward the inner ends of the projections.

B designates the upper section of the die, which is recessed upon its under side to coincide with the angular face of the lower section, A, and it is provided at one end with a projection, *d*, adapted to coact with the cut-away portion *a* of the lower die-section, thus forming an opening or recess between the dies at this end and corresponding in cross-section with the shank of the eye-bar, which is to lie therein.

C C refer to tapering-shaped blocks, which are secured on the recessed face of the section B at one end thereof, as illustrated in Fig. 1, and are so located that when the die-sections occupy proper relative positions the blocks C will abut against the outer edges of the projections *b* and prevent said section B from being moved on the section A in the direction opposite to that indicated by the arrow shown in Fig. 3.

D refers to a projection which is located on the inner face of the section B at the outer end thereof, and is so disposed that it will extend on both sides of the angular portion of the die-section. The inner portion of the projection D is cut away at *e* to present a curved seat by which the extreme end of the eye-bar is formed.

A frame, E, located on the upper face of the die-section B, is provided with a series of transverse rollers, *f*, upon which bears the former-head F or other agency that is to effect the operating of the die.

In practice the end of the bar as it comes from the rolls with parallel sides and edges is heated and laid upon the lower section between the projections *b*, and its end lying in position to enter the recess *e* of the projection D when the two sections are brought together. Power is then applied to close the die-section B upon the lower section, A, causing the metal at the heated portion of the flat bar to be bent into an angular form, so as to lap the angular faces of the section A. This angular bend in the bar is for the purpose of holding it straight during the process of upsetting, and as soon as the die is closed force is applied to the end of the upper section (the bar being held in the usual way from receding) and it is forced longitudinally over the lower die to the dotted line *x x*, Fig. 3, from left to right, and in this movement of the bar the metal of the bar is upset or spread laterally by the projection D, which also properly shapes it.

It will be noticed by reference to Fig. 2 that the space between the upper and lower die-sections enlarges somewhat in the direction of the sides to effect an increased thickening of the head at its turned-down portions. By this means it is not necessary to upset much of the head, as when the head portion is drawn or flattened down to the thickness desired it will be proportionately widened to form the shaped head desired. When the heated bar is in place between the sections A B and the latter is moved longitudinally over the former, the rollers insure a greater reduction in the friction.

It will also be understood that the movement of the section B also effects a drawing as well as a shaping action, thereby preventing any irregularity in the body of the metal. When the bar is moved from the die-sections, it is of the shape represented in Fig. 4, at which time it is ready to be flattened out, as shown in Fig. 5.

The several projections on the inside of the die-sections may be made movable and of different thickness for different thicknesses of bars to be operated upon.

Having thus described my invention, what I claim is—

1. An apparatus for the manufacture of eye-bars, consisting of upper and lower die-sections, as A B, means for moving one of said sections vertically in relation to the other and longitudinally over the face of the other, and an upsetting projection, D, on the face of the moving section, substantially as described.

2. An apparatus for the manufacture of eye-bars, consisting of a lower die-section, A, angular in cross-section, an upper die-section, B, corresponding thereto, a projection, D, on the face of one of said sections, and means for moving one of said sections vertically and longitudinally, substantially as described.

3. A pair of dies for forming eye-bars and the like, one of said dies having a projection, D, at one end, and the other having projections *b b* at the opposite end, with a space between the projections *b b*, substantially as described.

4. In the manufacture of eye-bars, a pair of dies having forming projections upon each die extending above the level of the die-surface proper, substantially as described.

5. In the manufacture of eye-bars, a pair of dies having forming projections upon each die extending above the level of the die-surface proper, one of said dies having longitudinal movement over the face of the other to upset the bar, substantially as described.

6. In combination, a pair of dies having forming projections upon each die extending above the level of the die-surface proper, one of said dies being stationary and the other having vertical and longitudinal movement, substantially as described.

7. In combination, the upper and lower dies, angular in cross-section, the surfaces of said dies diverging from each other from the center outward, substantially as described.

8. A pair of dies having projections upon their faces, having a cut-away portion, *a*, on one die and a projection, *d*, on the other die, substantially as described.

9. A pair of dies, one movable over the face of the other, a projection on one at one end and a pair of projections with a space between them on the other at the opposite end, the inner ends of the pair of projections being cut away, substantially as described.

10. The combination of upper and lower dies, triangular in cross-section, as shown, and having projections upon their inner or meeting faces, the upper one of said dies being adapted to move vertically and longitudinally over the lower die, substantially as described.

11. The combination, with a lower die and a vertically-moving upper die, of a former-head and a frame provided with rollers supported upon the upper die, substantially as described.

12. The combination, with an upper and a lower die having projections, as thus described, of the roller-frame, substantially as and for the purpose set forth.

13. The combination, with a lower die-section and a vertical movable upper die-section, of a former-head, and rollers interposed between the said head and die, substantially as described.

JOHN F. KINGSLEY.

Witnesses:
C. L. OSBORNE,
S. A. HINES.